US012020010B2

(12) United States Patent
Edwards et al.

(10) Patent No.: US 12,020,010 B2
(45) Date of Patent: Jun. 25, 2024

(54) CORRUPTION DETERMINATION OF DATA ITEMS USED BY A BUILD SERVER

(71) Applicant: HEWLETT PACKARD ENTERPRISE DEVELOPMENT LP, Houston, TX (US)

(72) Inventors: Nigel John Edwards, Bristol (GB); Guilherme de Campos Magalhaes, Rio Grande do Sul (BR)

(73) Assignee: Hewlett Packard Enterprise Development LP, Spring, TX (US)

( * ) Notice: Subject to any disclaimer, the term of this patent is extended or adjusted under 35 U.S.C. 154(b) by 421 days.

(21) Appl. No.: 17/444,774

(22) Filed: Aug. 10, 2021

(65) Prior Publication Data

US 2023/0049131 A1    Feb. 16, 2023

(51) Int. Cl.
| | |
|---|---|
| *G06F 21/56* | (2013.01) |
| *G06F 8/60* | (2018.01) |
| *G06F 11/07* | (2006.01) |
| *G06F 21/53* | (2013.01) |
| *G06F 21/64* | (2013.01) |
| *H04L 9/32* | (2006.01) |

(52) U.S. Cl.
CPC ............ *G06F 8/60* (2013.01); *G06F 11/0751* (2013.01); *G06F 21/53* (2013.01); *G06F 21/563* (2013.01); *G06F 21/64* (2013.01); *H04L 9/3236* (2013.01); *H04L 9/3247* (2013.01); *G06F 2221/033* (2013.01)

(58) Field of Classification Search
CPC .. G06F 21/53; G06F 21/563; G06F 2221/033; H04L 9/3236; H04L 9/3247
See application file for complete search history.

(56) References Cited

U.S. PATENT DOCUMENTS

| | | | |
|---|---|---|---|
| 10,853,090 B2 | 12/2020 | Jacquin et al. | |
| 11,494,493 B1* | 11/2022 | Baird | H04L 9/0894 |
| 2011/0276939 A1* | 11/2011 | Frankin | G06F 8/71 |
| | | | 717/101 |
| 2016/0292066 A1* | 10/2016 | Stevens | G06F 11/3624 |
| 2021/0141891 A1* | 5/2021 | Weinzettl | H04L 9/50 |
| 2021/0216636 A1* | 7/2021 | Devries | G06F 8/65 |
| 2021/0286871 A1* | 9/2021 | Lattin | H04L 63/12 |
| 2022/0198003 A1* | 6/2022 | Shaver | G06F 8/44 |
| 2022/0300256 A1* | 9/2022 | Baker | G06F 8/10 |

(Continued)

OTHER PUBLICATIONS

Bohling et al., Subverting Linux' Integrity Measurement Architecture, ACM, Jul. 20, 2008 (10 pages).

(Continued)

*Primary Examiner* — David J Pearson
(74) *Attorney, Agent, or Firm* — Trop, Pruner & Hu, P.C.

(57) ABSTRACT

In some examples, a system receives first measurements of data items used by a build server in building an executable program, the data items copied from a data repository to a storage partition that is separate from the data repository, and the storage partition to store the data items relating to building the executable program by the build server. The system determines, based on the first measurements and according to a policy specified for the storage partition, whether a corruption of the data items used by the build server in building the executable program has occurred.

18 Claims, 4 Drawing Sheets

(56) References Cited

U.S. PATENT DOCUMENTS

2022/0391541 A1* 12/2022 Novotny .................. G06F 8/41

OTHER PUBLICATIONS

Imperva, File Security & Integrity Monitoring; File Security & Integrity Monitoring; Published: Jan. 20, 2021, Retrieved Aug. 3, 2021, 10 Pgs.

Hewlett Packard Enterprise, Introducing Project Aurora: Enabling zero-trust security architectures from edge to cloud, Jun. 22, 2021 (11 pages).

Red Hat Enterprise Linux 7, Kernel Administration Guide; Enhancing Security with the Kernel Integrity Subsystem; Published: Apr. 26, 2021, Retrieved Aug. 3, 2021, 98 Pgs.

Sourceforge, Integerity Measurement Architecture, Integrity measurement architecture; Published: Feb. 5, 2018, Retrieved Aug. 3, 2021, 19 Pgs.

Wikipedia, GitHub last edited on Jul. 25, 2021 (21 pages).

Wikipedia, Trusted Platform Module last edited on Jul. 25, 2021 (22 pages).

* cited by examiner

CORRUPTION DETERMINATION OF DATA ITEMS USED BY A BUILD SERVER

BACKGROUND

A build server can include a compiler to build an executable program based on source files. The source files may be retrieved from a source file repository. Once the executable program has been built by the compiler based on the source files, the executable program can be delivered to an electronic device (or multiple electronic devices) for execution.

BRIEF DESCRIPTION OF THE DRAWINGS

Some implementations of the present disclosure are described with respect to the following figures.

Figure 1:
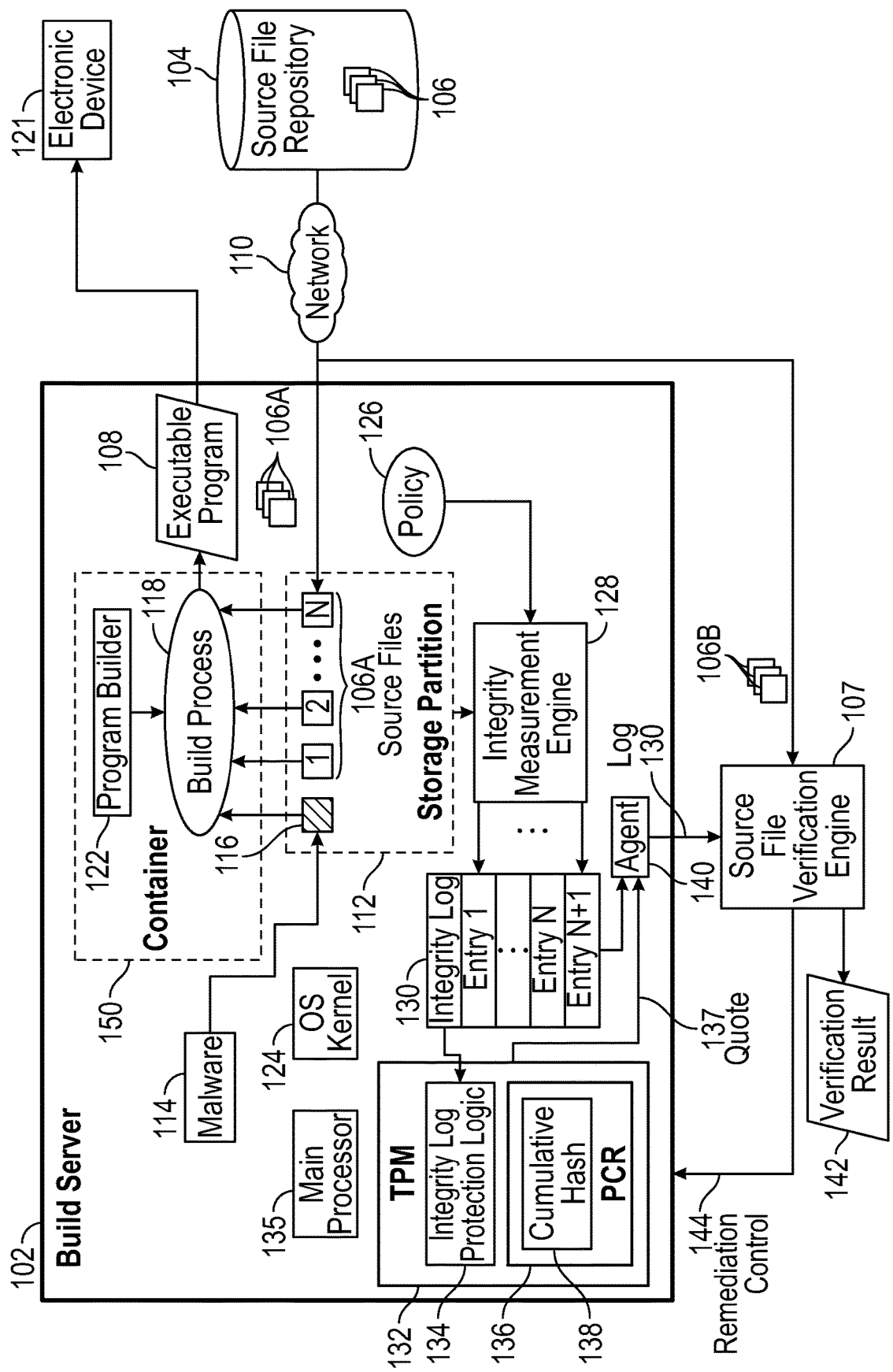
FIG. 1 is a block diagram of an arrangement that includes a build server, a source file repository, and a source file verification engine, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Malware may be introduced into a build server to corrupt an executable program built at the build server. For example, malware can add a source file (or multiple source files) to a collection of source files retrieved from a source file repository.

"Malware" may refer to a program or a machine that performs an unauthorized action with respect to a build server. "Malware" may also refer to a human that performs an unauthorized action with respect to a build server. A "collection of source files" can refer to a single source file or multiple source files. A "source file" includes a file that contains source code according to a programming language. A "file" can refer to any identifiable aggregation of data. A "builder server" can refer to a collection of computers in which a program builder is executed to produce an executable program. A "collection of computers" can refer to a single computer or multiple computers.

In some examples, the program builder in the build server can include a compiler that takes as input a collection of source files and produces a binary program in executable format. In other examples, a program builder can include an interpreter that converts source code in a programming language into machine code during runtime of a program that includes the source code. More generally, a "program builder" receives as input a collection of source files (and/or other data items) and produces an executable program that can execute in an electronic device.

A source file added by malware can create a backdoor to the executable program. The backdoor is accessible by an unauthorized entity (e.g., a person, a program, or a machine) to cause the executable program to perform unauthorized actions when the executable program is executed in an electronic device. An "electronic device" can refer to any type of computing device that can execute machine-readable instructions, such as a desktop computer, a notebook computer, a tablet computer, a smartphone, an Internet-of-Things (IoT) device, a game appliance, a printer, a home appliance, a communication node, a storage system, a vehicle, a controller in a vehicle, and so forth.

The backdoor can allow the unauthorized entity to retrieve confidential information or other information using the executable program. Alternatively, a source file added to the executable program may cause the executable program to perform malicious actions that may damage data or corrupt other items in an electronic device, or in devices connected to the electronic device.

In other examples, instead of adding a source file to a collection of source files that are used by the program builder to build an executable program, the malware can modify a source file to produce a modified source file that can cause the executable program built using the modified source file to perform malicious actions.

In some examples, a source file added by malware or modified by malware can exist in the build server for a relatively short amount of time, since the source files may be removed from the build server once the corresponding executable program has been built. As a result, it may be difficult to detect the presence of an added source file or a modified source file produced by malware in a build server.

In a large computing environment, a build server may deploy a corrupted executable program to a large quantity of electronic devices (e.g., thousands to hundreds of thousands of electronic devices). Examples of computing environments include a data center, a cloud environment, a storage area network (SAN), a communication network, so forth. In such cases, the corrupted executable program can cause a large disruption across a large number of electronic devices.

In some cases, source files for building an executable program can be dynamically added, such as to a file system of a given operating system (OS). An OS can maintain a large quantity of files in its file system. Thus, a verification system that attempts to detect corruption of all of the files of an OS file system may not be able to reliably detect corruption of source files used to build an executable program, since there would be a lot of noise if measurements are made of all files in the OS file system.

In accordance with some implementations of the present disclosure, a verification system copies data items (e.g., source files) from a data repository to a separate storage partition (e.g., in a build server or separate from the build server). If the data repository is implemented on a collection of storage devices (where a "collection of storage devices" can refer to a single storage device or multiple storage devices), then the separate storage partition can be implemented on a collection of storage devices that is distinct and separate from the collection of storage devices used to implement the data repository. In other examples, the separate storage partition can be a segment of the collection of storage devices separate from a segment of the collection of storage devices used to store the data items of the data repository.

A "storage device" can refer to a disk-based storage device, a solid-state drive, a memory device, and so forth.

The verification system can receive first measurements of data items in the separate storage partition that are used to build the executable program, and the verification system can compare the first measurements to second measurements of data items from the data repository. A comparison of the first measurements and the second measurements can provide an indication of whether or not the data items used for building the executable program have been corrupted, such as by malware or due to another cause.

FIG. 1 is a block diagram of an example arrangement that includes a build server 102, a source file repository 104, and a source file verification engine 107. In some examples, the source file repository 104 can be implemented with a storage device or multiple storage devices.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The source file repository 104 stores source files 106 that are to be used for building an executable program, such as an executable program 108 that can be built in the build server 102.

The build server 102 receive copies of the source files 106 from the source file repository 104 over a network 110. In some examples, the network 110 can include any or some combination of the following: a local area network (LAN), a wide area network (WAN), a public network (e.g., the Internet), or any other type of network. The copies of the source files 106 are represented as 106A in the build server 102. In the ensuing discussion, reference to "source files 106A" is a reference to copies of the source files 106 in the source file repository 104.

The source files 106 can be retrieved by the build server 102 from the source file repository 104, or another entity can cause the source files 106 to be copied from the source file repository 104 to the build server 102.

The source files 106A (including source files 1 to N, where N≥1) are stored in a storage partition 112 that is separate from a storage partition of the source file repository 104 that is used to store the source files 106. The storage partition 112 is a partition designated to store source files for building an executable program.

In FIG. 1, the storage partition 112 is part of the build server 102. For example, the storage partition 112 can be implemented using a collection of storage devices of the build server 102. In other examples, the storage partition 112 can be implemented on a collection of storage devices that is separate from the build server 102.

As further shown in FIG. 1, a malware 114 has been introduced into the build server 102. If the malware 114 is in the form of a program, the malware 114 can be introduced into the build server 102 based on a download of the malware 114 over the network 110 or from another source (e.g., a removable storage medium, an email attachment, etc.) to the build server 102. If the malware 114 is in the form of hardware, the malware 114 can include a physical chip or another device that has been physically installed or connected to the build server 102. As a further example, the malware 114 can refer to a human user that has access to the build server 102, either directly or over the network 110.

As shown in FIG. 1, the malware 114 has added a malware source file 116 into the storage partition 112, to be included as a collection of source files (additionally including source files 1 to N) used by a build process 118 in building the executable program 108. If the malware source file 116 is used by the build process 118 in building the executable program 108, then the executable program 108 is a corrupted executable program, which may include a backdoor to allow an unauthorized entity to access the executable program 108 when the executable program 108 is executed at an electronic device 121 after deployment of the executable program 108 in the electronic device 121. The executable program 108 can be deployed in multiple electronic devices.

In some examples, instead of being a separate source file from the source files 106A, the malware source file 116 can be a modified one (or multiple) of the source files 106A.

In some examples, the malware 114 can monitor processes invoked in the build server 102, to watch for a build process such as the build process 118. If the malware 114 detects that a build process has been invoked, then the malware 114 can add or modify a source file in the storage partition 112 to corrupt the source files used by the build process in building the executable program 108.

The build process 118 is a process of a program builder 122 in the build server 102. The program builder 122 can include a compiler or an interpreter, as examples.

The build server 102 includes an OS kernel 124, which can provide a file system. The source files 106A can be stored in the file system of the OS kernel 124. In some examples, the source files 106A are part of a build tree (including a hierarchical arrangement of source files such as in a hierarchical arrangement of directories and files of a file system). In some examples, as a source file 106A is received at the build server 102, the source file 106A can be added to the build tree. When the program builder 122 triggers the build process 118, the build process 118 retrieves the source files from the build tree in the storage partition 112 to build the executable program 108.

In accordance with some implementations of the present disclosure, a protection policy 126 can be associated with the storage partition 112 that is used to store the source files 106A. This protection policy 126 can be associated with a subset of all of the files in the file system of the OS kernel 124. The subset includes the files that are part of the storage partition 112, and excludes files of the OS file system that are not part of the storage partition 112.

The protection policy 126 can specify that measurements are to be computed for the source files in the storage partition 112. Thus, any source file that is present in the storage partition 112, including source files 1 to N and the malware source file 116, would be subject to measurement according to the protection policy 126.

The measurement of the source files in the storage partition 112 can be performed by an integrity measurement engine 128. In some examples, the integrity measurement engine 128 is implemented in the build server 102. In other examples, the integrity measurement engine 128 is implemented externally of the build server 102.

In an example, the integrity measurement engine 128 can include an Integrity Measurement Architecture (IMA) module of a Linux OS. The IMA is part of the Linux Security Modules (LSM) subsystem and provides measured and secure boot for the Linux OS. In some examples, the integrity measurement engine 128 applies measurements to the source files in the storage partition 112, according to the protection policy 126 (which can be an IMA policy). Although reference is made to the IMA of the Linux OS, in other examples, the integrity measurement engine 128 can refer to any engine that performs measurements of source files in the storage partition 112.

A "measurement" of a source file (or more generally, a data item) can include applying a function on the data item to produce a corresponding measurement value. For example, the function that is applied can be a cryptographic hash function, which when applied to the data item produces a hash value based on the content of the data item. In other examples, other types of functions can be applied to a data item as part of the measurement to produce a measurement value. A "data item" refers to any identifiable aggregation of data.

Before a source file 106A is made available to the build process 118 in the build server 102, the integrity measurement engine 128 computes a measurement value by applying a function on the source file 106A, in accordance with the protection policy 126. The integrity measurement engine 128 adds the measurement value produced by the measurement of the received source file 106A to a corresponding entry of an integrity log 130.

The integrity log 130 and the protection policy 126 can be stored in a memory of the build server 102, where the memory can be implemented using a collection of memory devices (non-volatile memory devices and/or volatile memory devices).

In the example of FIG. 1, the integrity log 130 includes multiple entries that correspond to respective source files in the storage partition 112. Entries 1 to N correspond to source files 1 to N (where N≥1). For example, when source file 1 is received at the build server 102, the integrity measurement engine 128 measures source file 1 and adds the corresponding measurement value to entry 1 in the integrity log 130. Similarly, when source file N is received at the build server 102, the integrity measurement engine 128 measures source file N and writes the corresponding measurement value to entry N of the integrity log 130.

For example, if a measurement value based on a source file is a hash value based on applying a cryptographic hash function on the source file, then each entry i (i=1 to N) of the integrity log 130 includes a respective hash value produced by measuring the respective source file i. Each entry i can additionally include further information, such as location information (e.g., a pathname, a uniform resource locator, etc.) identifying a location where source file i is stored, and so forth.

In the example of FIG. 1, it is assumed that the malware source file 116 was added by the malware 114 after source file N was received, at which point the integrity measurement engine 128 measures the malware source file 116 and adds the corresponding measurement value to entry N+1. In other examples, the malware source file 116 can be received in the storage partition 112 before source file 1, or somewhere between the receptions of source file 1 and source file N.

In some examples, the build server 102 includes a trusted platform module (TPM) 132. A TPM can refer to a secure cryptoprocessor that performs various security operations in the build server 102. In some examples, the TPM 132 can be implemented as a hardware chip, to provide hardware-based, security-related operations in the build server 102. The TPM 132 can perform cryptographic operations, for example. The TPM 132 includes physical security mechanisms to make the TPM 132 tamper-resistant, such as against tampering by the malware 114.

The TPM 132 is separate from a main processor 135 of the build server 102. The main processor 135 executes various machine-readable instructions of the build server 102, including the OS kernel 124, the program builder 122, and so forth. In some cases, the integrity measurement engine 128 can include machine-readable instructions executable on the main processor 135.

More generally, a secure processor (the TPM 132 is an example of the secure processor) is included in the build server 102, where the secure processor is separate from the main processor 135 and can provide protection for the integrity log 130 in accordance with some implementations of the present disclosure.

In some examples, the TPM 132 includes an integrity log protection logic 134 that is used to protect the integrity log 130 from tampering, such as by an unauthorized entity including the malware 114. The integrity log protection logic 134 can be implemented using a portion of the hardware processing circuit of the TPM 132, or with machine-readable instructions executable in the TPM 132. Note that the TPM 132 can execute machine-readable instructions, which can include machine-readable instructions stored in secure storage of the TPM 132.

The TPM 132 further includes various Platform Configuration Registers (PCRs), including a PCR 136 depicted in FIG. 1. A PCR allows for secure storage and reporting of security-relevant metrics.

In accordance with some implementations of the present disclosure, the PCR 136 stores a cumulative hash value 138 that is calculated based on the entries of the integrity log 130. In response to an addition of a new entry into the integrity log 130, the integrity log protection logic 134 applies a cryptographic hash function on all entries of the integrity log 130, including the newly added new entry.

For example, when source file 1 is received and corresponding entry 1 is added by the integrity measurement engine 128 to the integrity log 130, the integrity log protection logic 134 in the TPM 132 calculates a first cryptographic hash value based on entry 1. When source file 2 is received and corresponding entry 2 is added by the integrity measurement engine 128 to the integrity log 130, the integrity log protection logic 134 calculates a second cryptographic hash value based on entry 2, and the integrity log protection logic 134 combines the second cryptographic hash value with the cumulative hash value 138 in the PCR 136 to form a new cumulative hash value 138. When source file N is received and corresponding entry N is added by the integrity measurement engine 120 to the integrity log 130, the integrity log protection logic 134 calculates an Nth cryptographic hash value, and combines the Nth cumulative hash value with the present cumulative hash value 138 in the PCR 136, to form a new cumulative hash value. The new cumulative hash value derived from combining the Nth cumulative hash value with the present cumulative hash value 138 in the PCR 136 is effectively a cumulative hash value based on all of entries 1 to N of the integrity log 130.

In some examples, combining the i-th cryptographic hash value (CHV-i) in response to receiving source file i (i=1 to N) can be as follows:

$$newPCRValue = HASH(oldPCRValue \| CHV\text{-}i),$$

where HASH is a cryptographic hash function and ∥ represents an append operation in which oldPCRValue (the present cumulative hash value 138 in the PCR 136) is appended with CHV-i. The parameter newPCRValue represents the new cumulative hash value that is written as 138 to the PCR 136.

In accordance with some examples of the present disclosure, the source file verification engine 107 is used to verify source files added to the storage partition 112 for use by the build process 118 in building the executable program 108.

In examples according to FIG. 1, the source file verification engine 107 can be implemented in a collection of computers separate from the build server 102. In other examples, the source file verification engine 107 can be implemented in the build server 102.

In some examples, the TPM 132 does not have network access, and an agent 140 in the build server 102 is used as a proxy between the TPM 132 and the source file verification engine 107. The source file verification engine 107 receives a quote 137 from the TPM 132 (through the agent 140), and the integrity log 130 from the agent 140 in the build server 102. The agent 140 is a program or another entity in the build server 102 that interacts with the source file verification engine 107. In alternative examples, the TPM 132 can be configured to have network access, so that the TPM 132 can communicate directly with the source file verification engine 107 (including sending the quote 137 and providing a copy of the integrity log 130 to the source file verification engine 107).

The quote 137 from the TPM 132 includes signed information provided by the TPM 132, where the signed information includes a combination of the content of the PCR 136 and other information (discussed further below). The signed information from the TPM 132 can be signed using a private key of the TPM 132. The source file verification engine 107 can include a public key that can be used by the source file verification engine 107 to verify that the signed information originated from the TPM 132.

The provision of the quote 137 to the source file verification engine 107 allows the source file verification engine 107 to confirm that the copy of the integrity log 130 from the agent 140 has not been tampered with. The source file verification engine 107 can go through the copy of the integrity log 130 entry by entry to compute a cumulative hash value to be compared to the cumulative hash value included in the quote 137, to confirm that the copy of the integrity log 130 has not been tampered with.

In addition, after confirming that the copy of the integrity log 130 is valid, the source file verification engine 107 compares the measurements contained in the entries of the copy of the integrity log 130 with measurements computed based on copies (106B) of the source files 106 retrieved by the source file verification engine 107 from the source file repository 104, such as over the network 110. If the measurements contained in the copy of the integrity log 130 match the measurements computed by the source file verification engine 107, then the source file verification engine 107 can confirm that no source file in the storage partition 112 has been added or has been modified (and thus the executable program 108 built by the build process 118 has not been corrupted). However, if the measurements contained in the entries of the copy of the integrity log 130 do not match the measurements computed by the source file verification engine 107 based on the source files 106B retrieved from the source file repository 104, then the source file verification engine 107 can indicate that the source files in the storage partition 112 have been corrupted.

The source file verification engine 107 outputs a verification result 142. The verification result 142 can indicate whether or not the verification of the source files in the storage partition 112 was successful. A successful verification result indicates no corruption of the source files in the storage partition 112, whereas an unsuccessful verification result indicates that corruption of the source files in the storage partition 112 has occurred.

In some examples, the source file verification engine 107 can perform a remediation control 144 of the build server 102, in response to determining that the verification of the source files in the storage partition 112 was unsuccessful. The remediation control 144 can prevent any further booting by the build server 102, and/or can disable the build server 102 (e.g., by shutting down the build server 102 or preventing the build server 102 from completing its boot procedure), and/or sending an alert to a target entity (e.g., an administrator or another entity), and so forth.

As further shown in in FIG. 1, the program builder 122 and the build process 118 can execute in a container 150. The container 150 is an example of an isolated virtual environment in the build server 102. In some examples, there may be multiple containers in the build server 102 for performing different functions. The container 150 is used to perform building of an executable program.

By running the build process 118 in the container 150, the build process 118 itself can be protected against corruption, such as by the malware 114.

In other examples, a different isolated virtual environment can be used to execute the build process 118, such as a virtual machine (VM) in a hypervisor environment.

Figure 2:
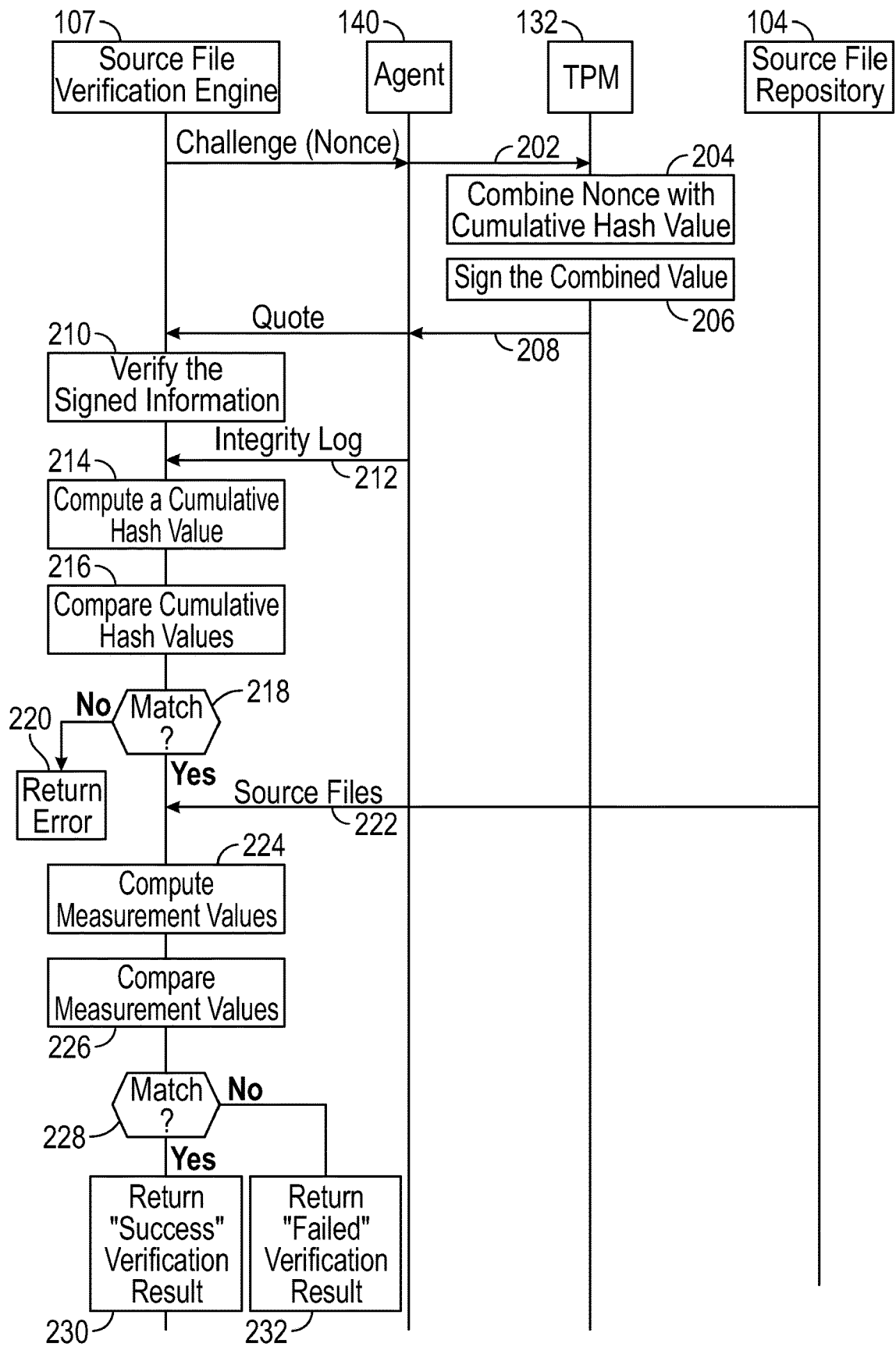
FIG. 2 is a message flow diagram of a process according to some examples.

FIG. 2 is a flow diagram of a process involving the source file verification engine 107, the agent 140, the TPM 132, and the source file repository 104. Although FIG. 2 shows a specific sequence of tasks, it is noted that in other examples, the tasks can be performed in a different order, some tasks can be omitted, or other tasks may be employed. The discussion below also refers to FIG. 1.

The source file verification engine 107 can be requested to perform a verification of the source files in the storage partition 112 of the build server 102. The request can be from a user or another entity, such as a program or a machine.

The source file verification engine 107 sends (at 202) a challenge to the agent 140, which forwards the challenge to the TPM 132. The challenge includes a nonce, which can be a random value produced by the source file verification engine 107. The random value can be generated by a random number generator or a pseudorandom number generator in the source file verification engine 107.

In response to the challenge, the TPM 132 combines (at 204) the nonce with the cumulative hash value 138 in the PCR 136. Note that the TPM 132 may combine the nonce and the cumulative hash value 138 with other information as well. The combination of the nonce, the cumulative hash value 138, and possibly other information produces combined information. The TPM 132 signs (at 206) the combined information, such as with a private key of the TPM 132, to produce signed information.

The TPM 132 sends (at 208) a quote (such as the quote 137 in FIG. 1) to the agent 140, which forwards the quote to the source file verification engine 107. The quote includes the signed information produced by the TPM 132.

In response to receiving the quote including the signed information from the TPM 132, the source file verification engine 107 verifies (at 210) the signed information, which includes decrypting the signed information. The decryption can use a public key of the TPM 132 that has been sent to the source file verification engine 107. If the source file verification engine 107 is able to verify the signed information, that provides an indication to the source file verification engine 107 that the source (the TPM 132) of the signed information is authentic. As part of the decryption of the signed information, the cumulative hash value 138 is extracted from the signed information.

The source file verification engine 107 also receives (at 212) a copy of the integrity log 130 from the agent 140. The agent 140 can send the copy of the integrity log 130 to the source file verification engine 107 in response to a request from the source file verification engine 107, for example.

The source file verification engine 107 computes (at 214) a cumulative hash value based on entries of the copy of the integrity log 130 (using a process similar to that used by the TPM 132 in computing the cumulative hash value 138), and the source file verification engine compares (at 216) the computed cumulative hash value with the cumulative hash value extracted from the signed information received from the TPM 132.

If the cumulative hash values do not match as determined by the source file verification engine 107 (at 218), the source file verification engine 107 returns (at 220) an error, and further verification operations are stopped. The error indication provides an indication that tampering has occurred with the integrity log 130, such that the verification of the source files in the storage partition 112 was unsuccessful.

However, if the cumulative hash values match, as determined (at 218), then the source file verification engine 107 retrieves (at 222) source files 106B from the source file repository 104.

The source file verification engine 107 computes (at 224) measurement values based on measurements of the retrieved source files 106B (e.g., based on applying a cryptographic hash function to the retrieved source files 106B), and compares (at 226) the computed measurement values to corresponding measurement values in the entries of the copy of the integrity log 130.

The source file verification engine 107 determines (at 228) whether the measurement values match. The source file verification engine 107 returns a verification result (e.g., 142 in FIG. 1) based on the determination (at 228).

If the computed measurement values match the measurement values in the copy of the integrity log 130, then the source file verification engine 107 returns (at 230) a "success" verification result indicates a successful verification of the source files in the storage partition 112. However, if the computed measurement values do not match the measurement values in the copy of the integrity log 130, then the source file verification engine 107 returns (at 232) a "failed" verification result that indicates that the verification of the source files in the storage partition 112 was unsuccessful.

Figure 3:
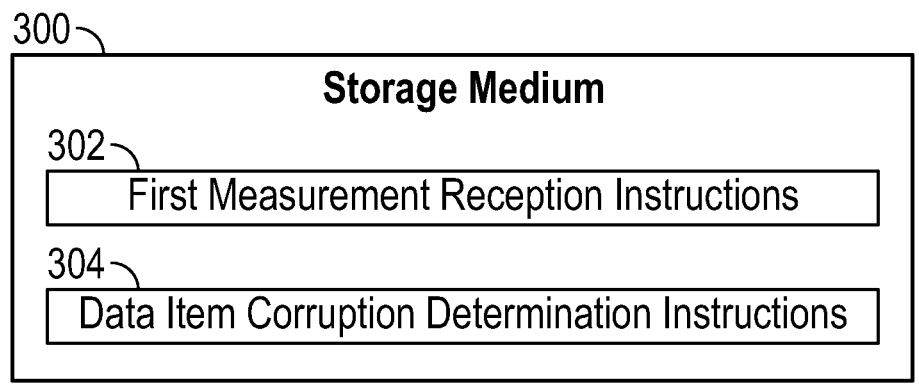
FIG. 3 is a block diagram of a storage medium storing machine-readable instructions, according to some examples.

FIG. 3 is a block diagram of a non-transitory machine-readable or computer-readable storage medium 300 storing machine-readable instructions that upon execution cause a system to perform various tasks. The system can include a collection of computers used to implement the source file verification engine 107 (FIG. 1), for example.

The machine-readable instructions include first measurement reception instructions 302 to receive first measurements of data items used by a build server (e.g., 102 in FIG. 1) in building an executable program. The data items are copied from a data repository (e.g., 104 in FIG. 1) to a storage partition (e.g., 112 in FIG. 1) that is separate from the data repository, and the storage partition stores data items relating to building executable programs by the build server.

The machine-readable instructions include data item corruption determination instructions 304 to determine, based on the first measurements and according to a policy specified for the storage partition, whether a corruption of the data items used by the build server in building the executable program has occurred.

In some examples, the machine-readable instructions can generate second measurements of the data items received from the data repository, and indicate that the corruption of the data items used by the build server in building the executable program has occurred responsive to the first measurements and the second measurements not matching. By comparing the first measurements to the second measurements, the system is able to identify data item(s) used by the build server that is (are) different from corresponding data item(s) at the data repository.

In some examples, the policy specifies that a verification is to be performed for the data items in the storage partition that are dynamically added for building the executable program. Verification is not performed for data items not in the storage partition. In this manner, verification is not based on measurements of data items outside the storage partition—there can be a large quantity of such data items outside the storage partition (e.g., data items in the file system of an OS) that can make verification of data items used by a build server more complex and less reliable.

In some examples, the first measurements are from a log protected by a security processor (e.g., the TPM 132 in FIG. 1) in the build server. In this way, the system is able to first confirm that the log has not been tampered with before verifying that data items used by the build server have not been corrupted.

In some examples, the policy specifies that temporary data items created as part of the building of the executable program are not to be measured, and the first measurements do not include measurements of the temporary data items. The temporary data items created by the build server in building the executable program would cause a verification error if included as part of the measured data items, as such temporary data items are not in the data repository.

Figure 4:
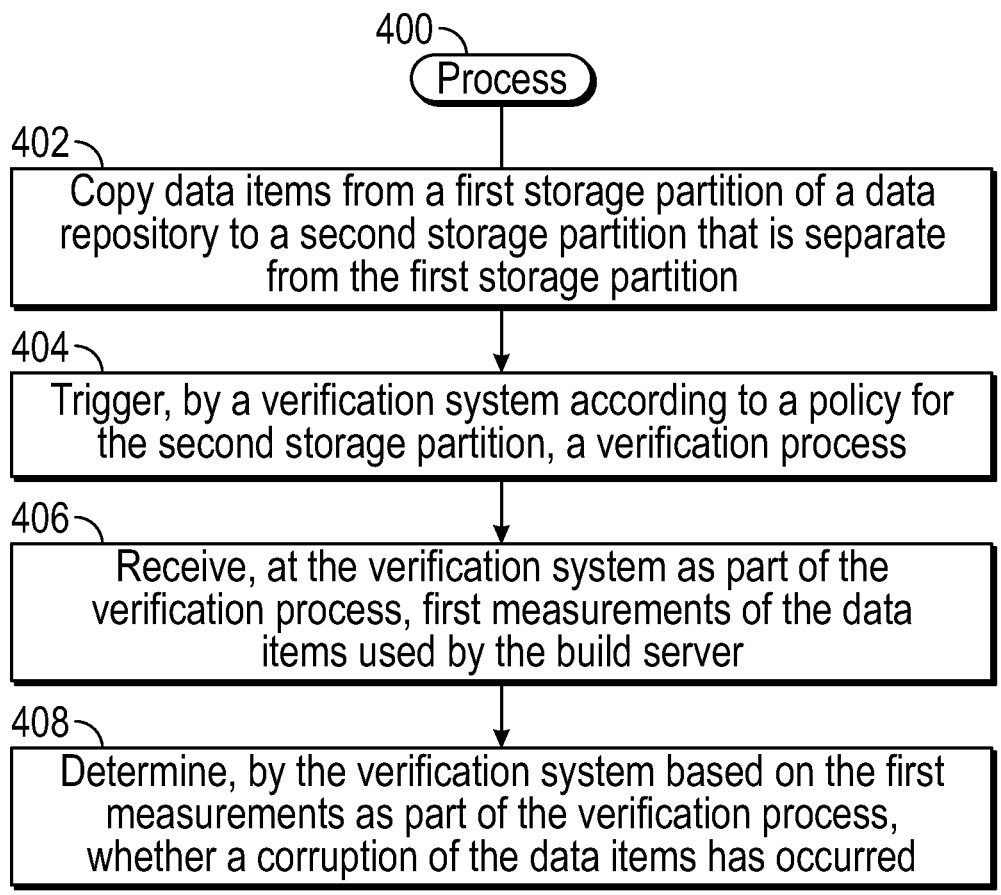
FIG. 4 is a flow diagram of a process according to some examples.

FIG. 4 is a flow diagram of a process 400 according to some examples. The process 400 includes copying (at 402) data items from a first storage partition of a data repository (e.g., 104 in FIG. 1) to a second storage partition (e.g., 112 in FIG. 1) that is separate from the first storage partition, where the data items are dynamically added to the data repository and relate to building an executable program by a build server.

The process 400 includes triggering (at 404), by a verification system according to a policy for the second storage partition, a verification process for the data items in the build server. The triggering of the verification process by the verification system can be in response to a user request or a request from another entity. Also, the policy for the second storage partition can specify that measurements are to be performed on data items in the second storage partition, and not on data items outside the second storage partition. Restricting the data items that are measured can reduce noise associated with verifying data items used in building an executable program.

The process 400 includes receiving (at 406), at the verification system as part of the verification process, first measurements of the data items used by the build server in building the executable program.

In some examples, the first measurements are retrieved from a log protected by a security processor in the build server. In some examples, the security processor is to protect the log based on computing a cryptographic value based on entries in the log containing the first measurements, and signing the cryptographic value. In some examples, the first measurements include hash values derived from the data items in the second storage partition.

The process 400 includes determining (at 408), by the verification system based on the first measurements as part of the verification process, whether a corruption of the data items used by the build server in building the executable program has occurred.

Figure 5:
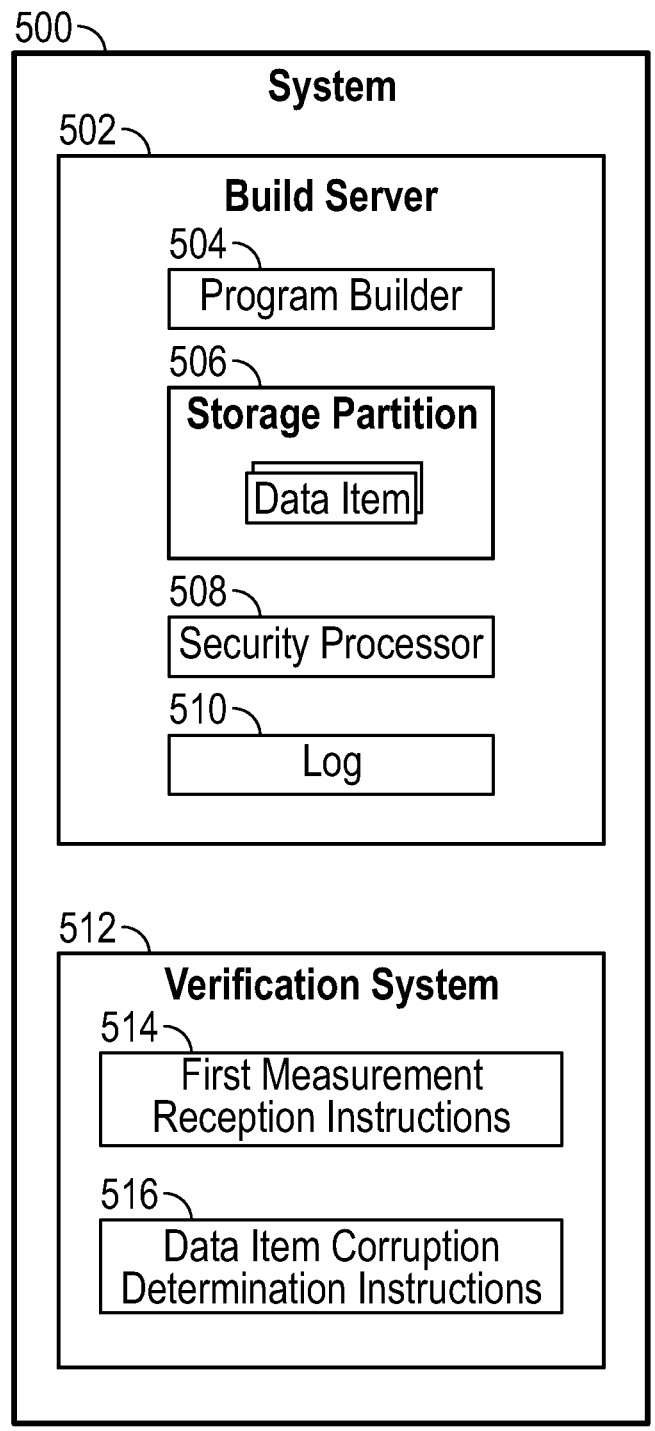
FIG. 5 is a block diagram of a system according to some examples.

FIG. 5 is a block diagram of a system 500 according to some examples. The system 500 includes a build server 502. The build server 502 includes a program builder 504 to build an executable program based on first data items retrieved from a data repository and stored in a storage partition 506 of the build server. The storage partition 506 is separate from the data repository.

The build server 502 includes a security processor 508, such as a TPM. The build server 502 also stores a log 510 protected by the security processor 508. The log 510 stores first measurements of the first data items in the build server 502.

The system 500 further includes a verification system 512 that includes machine-readable instructions executable on a processor of the verification system to perform various tasks. The machine-readable instructions executable by the verification system 512 include first measurement reception instructions 514 to receive the first measurements from the log 510 in the build server 502.

The machine-readable instructions executable by the verification system 512 include data item corruption determination instructions 516 to determine, based on the first measurements and second measurements of copies of the first data items retrieved from the data repository, whether a corruption of the first data items in the build server 502 has occurred.

If the first data items include a data item that is not present or has been modified from a data item in the data repository, the verification system 512 is to determine that the corruption of the first data items has occurred.

If the first data items include identical copies of the first data items retrieved from the data repository, the verification system 512 is to determine that the corruption of the first data items has not occurred.

A storage medium (e.g., 300 in FIG. 3) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
receive first measurements of data items used by a build server in building an executable program, the data items copied from a data repository to a storage partition that is separate from the data repository, and the storage partition to store the data items relating to building the executable program by the build server; and
determine, based on the first measurements and according to a policy specified for the storage partition, whether a corruption of the data items used by the build server in building the executable program has occurred,
wherein the first measurements are from a log protected by a security processor in the build server.

2. The non-transitory machine-readable storage medium of claim 1, wherein the first measurements are based on the data items in the storage partition that is part of the build server or that is separate from the build server.

3. The non-transitory machine-readable storage medium of claim 2, wherein the instructions upon execution cause the system to:
generate second measurements of the data items received from the data repository; and
indicate that the corruption of the data items used by the build server in building the executable program has occurred responsive to the first measurements and the second measurements not matching.

4. The non-transitory machine-readable storage medium of claim 3, wherein the instructions upon execution cause the system to:
responsive to the first measurements and the second measurements not matching, indicate that a data item used by the build server in building the executable program is not in the data repository or is different from a corresponding data item in the data repository.

5. The non-transitory machine-readable storage medium of claim 3, wherein the policy specifies that a verification is to be performed for the data items in the storage partition that are dynamically added for building the executable program.

6. The non-transitory machine-readable storage medium of claim 1, wherein the first measurements of the data items used by the build server in building the executable program comprise measurements of the data items used in building the executable program in an isolated virtual environment of the build server.

7. The non-transitory machine-readable storage medium of claim 6, wherein the building of the executable program is by a program builder in the isolated virtual environment, the program builder in the isolated virtual environment being protected against corruption by malware in the build server.

8. The non-transitory machine-readable storage medium of claim 1, wherein the policy specifies that temporary data items created as part of the building of the executable program are not to be measured, and wherein the first measurements do not include measurements of the temporary data items.

9. A method comprising:
copying data items from a first storage partition of a data repository to a second storage partition that is separate from the first storage partition, the data items dynamically added to the data repository and relating to building an executable program by a build server;
triggering, by a verification system according to a policy for the second storage partition, a verification process for the data items in the build server;
receiving, at the verification system as part of the verification process, first measurements of the data items used by the build server in building the executable program; and
determining, by the verification system based on the first measurements as part of the verification process, whether a corruption of the data items used by the build server in building the executable program has occurred,
wherein the first measurements are retrieved from a log protected by a security processor in the build server.

10. The method of claim 9, wherein security processor is to protect the log based on computing a cryptographic value based on entries in the log containing the first measurements, and signing the cryptographic value.

11. The method of claim 9, wherein the first measurements comprise hash values derived from the data items in the second storage partition.

12. The method of claim 9, comprising:
generating, by the verification system, second measurements of the data items received from the data repository,
wherein the determining is further based on the second measurements.

13. The method of claim 12, comprising:
responsive to the first measurements and the second measurements not matching, indicating that a data item in the build server used to build the executable program is not in the data repository or is different from a corresponding data item in the data repository.

14. The method of claim 9, wherein the first measurements of the data items used by the build server in building the executable program comprise measurements of the data items used in building, by a compiler, the executable program in an isolated container of the build server.

15. The method of claim 9, wherein the policy specifies that temporary data items created as part of the building of the executable program are not to be measured, and wherein the first measurements do not include measurements of the temporary data items.

16. A system comprising:
a build server comprising:
at least one hardware processor;
a program builder to execute via the at least one hardware processor to build an executable program based on first data items retrieved from a data repository and stored in a storage partition of the build server, the storage partition separate from the data repository,
a security processor, and
a log protected by the security processor and to store first measurements of the first data items in the build server; and
a verification system comprising machine-readable instructions executable on a hardware processor of the verification system to:
receive the first measurements from the log in the build server, and
determine, based on the first measurements and second measurements of copies of the first data items retrieved from the data repository, whether a corruption of the first data items in the build server has occurred.

17. The system of claim 16, wherein:
if the first data items comprise a data item that is not present or has been modified from a data item in the data repository, the verification system is to determine that the corruption of the first data items has occurred, and
if the first data items comprise identical copies of the first data items retrieved from the data repository, the verification system is to determine that the corruption of the first data items has not occurred.

18. The system of claim 16, wherein the build server comprises an isolated virtual environment in which the program builder is executable to build the executable program.

* * * * *